United States Patent [19]

Webb

[11] Patent Number: 4,674,225

[45] Date of Patent: Jun. 23, 1987

[54] ANTI-SNAGGING FISH HOOK DEVICE

[76] Inventor: Charles A. Webb, 43 Morton St., Waltham, Mass. 02154

[21] Appl. No.: 866,731

[22] Filed: May 27, 1986

[51] Int. Cl.⁴ .............................................. A01K 83/00
[52] U.S. Cl. ...................................... 43/43.4; 43/43.6
[58] Field of Search ...................... 43/43.2, 43.4, 43.6, 43/42.4

[56]  References Cited

U.S. PATENT DOCUMENTS

| | | | |
|---|---|---|---|
| 801,437 | 10/1905 | Baker | 43/43.6 |
| 1,166,529 | 1/1916 | Kruse | 43/43.6 |
| 2,215,908 | 9/1940 | Lauby | 43/35 |
| 2,424,599 | 7/1947 | Burns | 43/43.4 |
| 2,501,753 | 3/1950 | Ayers | 43/43.6 |
| 2,811,804 | 11/1957 | Heath | 43/43.6 |
| 2,932,114 | 4/1960 | Meucci | 43/43.6 |
| 3,352,051 | 11/1967 | Stewart, III | 43/42.1 |
| 3,562,948 | 2/1971 | Santo | 43/43.4 |
| 3,839,812 | 10/1974 | Louthan | 43/43.6 |
| 3,908,298 | 9/1975 | Strader | 43/42.05 |

FOREIGN PATENT DOCUMENTS 119160  7/1947  Sweden ................................ 43/43.6

Primary Examiner—Gene P. Crosby
Attorney, Agent, or Firm—Hamilton, Brook, Smith & Reynolds

[57]  ABSTRACT

A weedless hook apparatus having a regular fishing hook of a barbed type. A spring or other resilient member is attached at one end thereof to the front portion of the fish hook and a loop connected to the other end of the tension spring connects around the barb of the hook to hold it in place. A resilient cone shaped member is attached at the smaller forward end thereof to the spring and encircles the spring. The other, larger rearward end of the cone shaped member extends over and around the pointed portion of the hook when the spring is connected to the barb. The resilient cone will substantially prevent snagging of the hook when it comes in contact with weeds or other snags but when a fish clamps its jaws down against the cone, it will push the spring downwardly. Then as the angler sets the hook in response to such biting by the fish, the hook point penetrates the fish's mouth. In a second embodiment the resilient cone shaped member is eliminated.

6 Claims, 7 Drawing Figures

ANTI-SNAGGING FISH HOOK DEVICE

TECHNICAL FIELD

The present invention relates generally to fish hooks and more particularly to an improved weedless hook for fishing.

BACKGROUND ART

When fishing with light tackle or the like good fish habitat includes areas which have many weeds, logs, branches, rocks, etc. These provide natural hiding places for the fish and also attract smaller fish and other food upon which the larger fish feed. When trying to fish around or through such snags or obstructions, the hook on the end of the fisherman's line quite often catches these snags. A common problem when fishing weedy areas of the water is that once the hook catches weeds, the opportunity to catch a fish on the same cast is virtually eliminated.

Consequently, weedless hooks of various types have been designed to prevent the snagging of the aforementioned objects, while at the same time being able to hook and hold a fish when it hits the hook. A problem with such prior art weedless or snagless hooks is that they have not been altogether dependable in preventing snags and even when they dependably prevent snags or the catching of weeds thereon, they often also prevent a good hooking and catching action when a fish strikes the hook.

Accordingly there is a need for a better weedless or snagless hook apparatus.

DISCLOSURE OF THE INVENTION

The present invention relates to a weedless hook apparatus having a regular fishing hook of a barbed type. A spring or other resilient member is attached at one end thereof to the front portion of the fish hook and a loop connected to the other end of the tension spring connects around the barb of the hook to hold it in place. A resilient cone shaped member is attached at the smaller forward end thereof to the spring and encircles the spring. The other, larger rearward end of the cone shaped member extends over and around the pointed portion of the hook when the spring is connected to the barb. The resilient cone will substantially prevent snagging of the hook when it comes in contact with weeds or other snags but when a fish clamps its jaws down against the cone, the fish's jaws will depress down the cone and spring or elastic member. As the angler pulls to set the hook, the hook penetrates the rubber cone. Immediately thereafter, the hook point passes through the rubber cone and penetrates the fish's mouth and, at the same time, the loop comes off the hook barb. In an alternate embodiment the cone is eliminated.

An object of the present invention is to provide an improved weedless hook.

Another object of the present invention is to provide a weedless hook which is dependable to prevent weeds or other snags from engaging the hook when it is pulled through the water and which also will not be an impediment to hooking fish which grab the hook.

Another object of the present invention is to provide a weedless hook of the aforementioned type which is economical to construct and simple to use Other objects, advantages, and novel features of the present invention will become apparent from the following detailed description of the invention when considered in conjunction with the accompanying drawings.

BEST MODES FOR CARRYING OUT THE INVENTION

Figure 1:
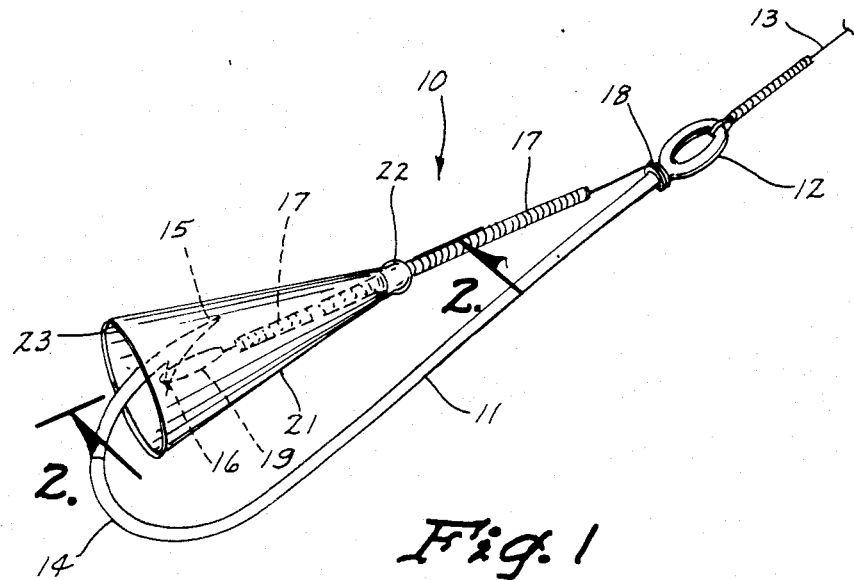
FIG. 1 is a perspective view of a preferred embodiment of the present invention shown in its weedless or snagless position.

Referring now to the drawings wherein like reference numerals designate identical or corresponding parts throughout the several views, FIG. 1 shows a weedless hook (10) constructed in accordance with the present invention and having a shank portion (11) which is substantially straight and has an eye (12) on the forward end thereof for attaching a line (13) from a fishing pole. A hook portion (14) is attached to the other end of the shank (11) and has a pointed portion (15) on the extreme end thereof. A pointed barb (16) is attached to the pointed end (15) as can readily be seen in FIG. 2.

Figure 2:
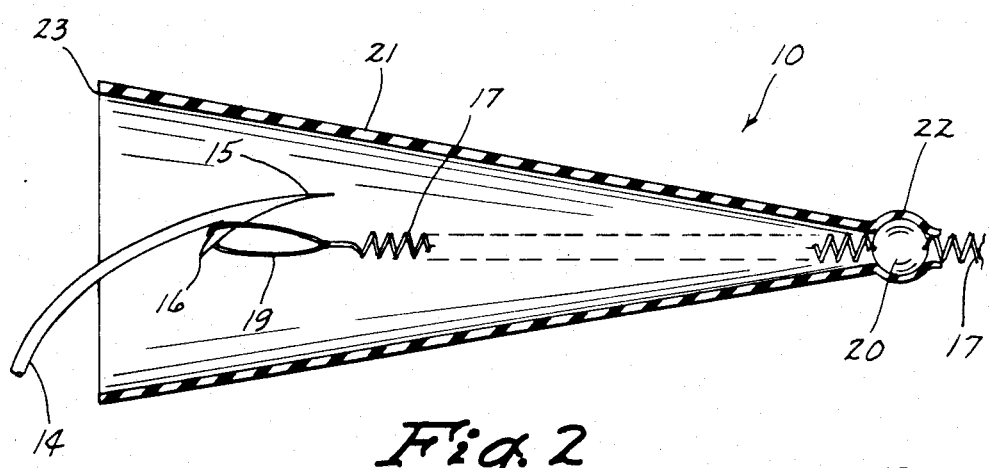
FIG. 2 is an enlarged partial cross sectional view taken along line 2—2 of the FIG. 1.

A tension spring (17) is attached at attachment point (18) to the front of the shank (11) and this tension spring (17) has a loop (19) attached to the other end thereof as can best be seen in FIG. 2. The central bead (20) is attached to the tension spring (17). A replaceable rubber cone, similar to the material used for a party balloon, is attached at the forward, pointed end (22) thereof to the bead (20) so that it can move about the bead (20) to some extent if desired. The other end (23) of the rubber cone extends over and around the point (15) and barb (16) of the hook portion (14).

Figure 3:
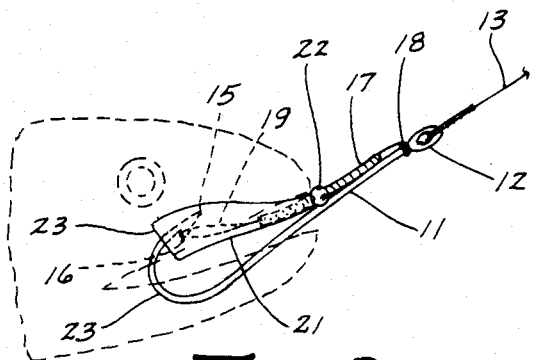
FIG. 3 is a view of the embodiment of FIG. 1 showing a fish head in dashed lines to illustrate what happens when a fish bites down on this apparatus.

In operation of the weedless hook (10), the loop (19) is first stretched from the position shown in FIG. 3 to the position shown in FIGS. 1 and 2 wherein the loop (19) extends around the barb (16) and the tension of the spring (17) will hold the spring (17), loop (19) and rubber cone (21) substantially in the position shown in FIGS. 1 and 2. When the rubber cone is in such a position, it can be drug through weeds and come into contact with other snags or the like without hooking into such snags. However, when a fish clamps its mouth over the hook portion (14) and point (15) as shown in FIG. 3, the fish's jaws will depress down on the cone (21) and spring or elastic (17); the cone is now in a position as shown in FIG. 3. As the angler pulls to set the hook (11), the hook point (15) penetrates the rubber cone (21) and, at the same time, the loop (19) comes off the hook barb (16) and the device is pushed to the back of the hook as shown in FIG. 4.

Because of the thinness of the rubber cone (21) (about like a party balloon), it can be punctured very easily. As soon as it penetrates the cone (21), it starts to penetrate the fish.

To use again, simply stretch open the hole the hook point made and pull hook back through the hole. It can withstand many punctures before it has to be replaced.

Figures 4, 5:
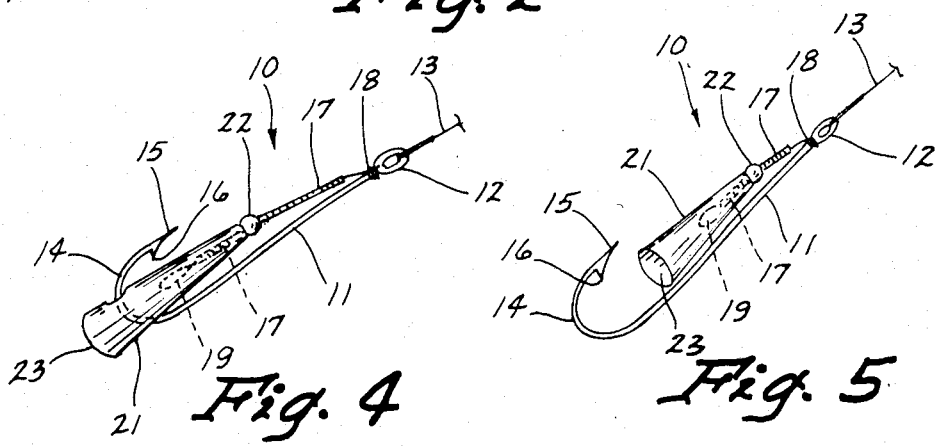
FIG. 4 is a perspective view of the preferred embodiment of the present invention as shown in FIGS. 1 and 2 after a fish has clamped its mouth around the cone and spring as shown in FIG. 3 and an angler pulls the line to set the hook into the fish's jaw.
FIG. 5 is an alternate embodiment of the present invention which is substantially identical to FIGS. 1 and 2 but which has a tension spring shorter than that shown in FIG. 1 when in its relaxed position whereby it will pull the cone completely clear of the bar of the hook when released by a fish.

Referring to FIG. 4, it is noted that the point (15) of the hook (10) extends through the rubber cone (21) in moving from the position shown in FIG. 1 to the position shown in FIG. 3. Alternatively, in the FIG. 5 embodiment, the unstretched length of the spring (17) is so short that it will pull the cone completely clear of the pointed end (15) when it is released by a fish. Otherwise, the FIG. 5 embodiment is in all respects the same as that shown in FIGS. 1 and 2.

Figure 6:
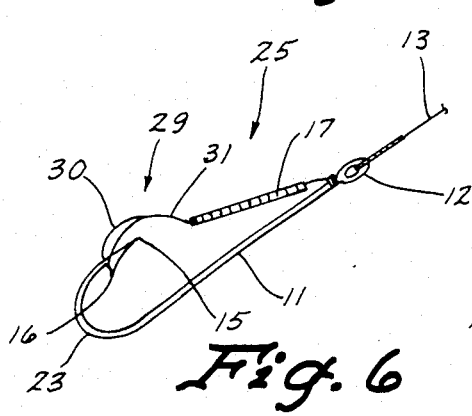
FIG. 6 is a still further alternate embodiment of the present invention shown in a position in use before a fish has clamped its jaws around it.
Figure 7:
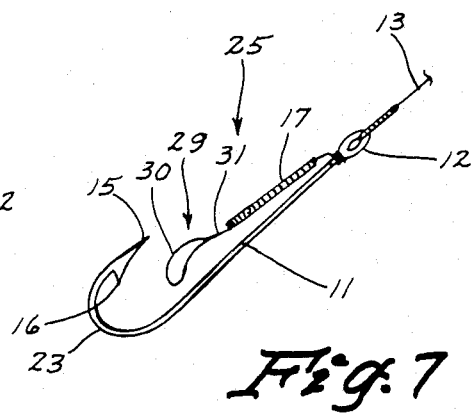
FIG. 7 is a view of the FIG. 6 embodiment after a fish has clamped its jaws around the device and caused the loop to disengage the barb of the hook.

Referring now to FIGS. 6 and 7, it is noted that this alternate embodiment (25) eliminates the use of a rubber cone. Instead, a stiff wire loop (29), such as piano wire, is used instead of loop (19) in the FIG. 1 embodiment. This stiff wire loop includes a portion (31) which is bent upwardly from where it connects to spring (17). The stiff wire portion (31) is formed into a loop (30).

In operation of the embodiment of FIGS. 6 and 7, the spring (17) would be stretched from the FIG. 7 position to the FIG. 6 position and the loop (30) engaged around the barb (16). In this position the hook is rendered substantially weedless and snagless because weeds or snags which come into contact with loop (30) will cause the entire hook to be deflected away from the weed or snag and/or will deflect the weed or snag away from the hook. But when a fish clamps its jaws around the weedless hook (25) (for example in the position shown in FIG. 3) the spring (17) and loop assembly (29) will be pushed towards the shank (11) of the hook. Then when the angler pulls on the line (13), in response to a sensing of the fish biting on the weedless hook (25), the point (15) and barb (16) will penetrate the fish's mouth and the fish can be pulled in.

Accordingly, it will be appreciated that the embodiments disclosed do indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:
1. A weedless hook apparatus comprising:
a substantially straight shank portion having a forward end and a rear end;
means for attaching a line on the forward end of said shank portion;
a hook portion extending from the rear end of said shank portion;
a forwardly extending pointed free end on said hook portion;
a rearwardly extending barb attached to said pointed free end;
resilient means attached at one end thereof to said forward end of the shank portion for exerting a tension force; and
a rigid arced loop means attached to the other end of said resilient means for extending over and around said barb, said rigid arced loop means having a loop connected by a loop shank portion to said resilient means, said loop shank portion and said rigid arced loop means having a radius of curvature such that said shank and loop means are bent upwardly from said resilient means forming said rigid arced loop means, said shank portion and resilient means being formed from a single stiff wire, the combined length of said resilient means and said rigid arced loop means being less than the distance between the barb and the forward end of said shank portion whereby when said resilient means is stretched so that said rigid arced loop means extends around said barb, such that the arced loop is bent to arc away from the shank and the pointed free end, thereby protecting the pointed free end of the hook from snagging on weeds or other inanimate objects, the tension force of said resilient means will hold the rigid arced loop means on the barb until a fish has pushed the rigid arced loop means down and the barb is pulled into the fish's mouth.

2. A weedless hook apparatus comprising:
a substantially straight shank portion having a forward end and a rear end;
means for attaching a line on the forward end of said shank portion;
a hook portion extending from the rear end of said shank portion;
a forwardly extending pointed free end on said hook portion;
a rearwardly extending barb attached to said point free end;
resilient means attached at one end thereof to said forward end of the shank portion for exerting a tension force;
loop means attached to the other end of said resilient means for extending over and around said barb, the combined length of said tension means and said loop means being less than the distance between the barb and the forward end of said shank portion whereby when said resilient means is stretched so that said loop means extends around said barb, the tension force of said resilient means will hold the loop means on the barb until a fish has pushed the loop means down and the barb is pulled into the fish's mouth; and
resilient cone shaped means attached to said tension means at the forward smaller end thereof and extending over and around said pointed free end and barb at the larger rear end thereof in a first position when said loop means is connected around said barb, said resilient cone shaped means being penetrated by the hook portion and displaced from said first position to a second position when a fish depresses the cone shaped means and tension means and an angler pulls on the line thereby disengaging the loop from said barb whereby the pointed free end can extend through the wall of a fish's mouth.

3. A weedless hook apparatus as claimed in claim 2 wherein said resilient cone shaped means avoids being penetrated by the hook portion when said loop becomes disengaged from said hook portion by a fish depressing on said cone and said spring means.

4. A weedless hook apparatus as claimed in claim 2 further comprising a central bead attached to said resilient means for securing the smaller end of said cone so that it can move about the bead.

5. A weedless hook apparatus as claimed in claim 2 wherein said resilient means is a spring.

6. A weedless hook apparatus as claimed in claim 2 wherein said resilient means is an elastic member.

* * * * *